US012573066B2

(12) United States Patent
Sengupta et al.

(10) Patent No.: US 12,573,066 B2
(45) Date of Patent: Mar. 10, 2026

(54) DEPTH ESTIMATION USING A SINGLE NEAR-INFRARED CAMERA AND DOT ILLUMINATOR

(71) Applicant: Google LLC, Mountain View, CA (US)

(72) Inventors: Kuntal Sengupta, San Jose, CA (US); Adarsh Prakash Murthy Kowdle, Mountain View, CA (US); Andrey Zhmoginov, Mountain View, CA (US); Hart Matthew Levy, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 348 days.

(21) Appl. No.: 17/981,891

(22) Filed: Nov. 7, 2022

(65) Prior Publication Data

US 2024/0153116 A1     May 9, 2024

(51) Int. Cl.
*G06T 7/521*          (2017.01)
*G06F 21/32*          (2013.01)
(Continued)

(52) U.S. Cl.
CPC .............. *G06T 7/521* (2017.01); *G06F 21/32* (2013.01); *G06V 40/172* (2022.01); *G06V 40/40* (2022.01);
(Continued)

(58) Field of Classification Search
CPC ........... G06T 7/521; G06T 2207/10048; G06T 2207/20081; G06T 2207/30201; G06F 21/32; G06V 40/172; G06V 40/40
See application file for complete search history.

(56) References Cited

U.S. PATENT DOCUMENTS 8,457,367 B1     6/2013  Sipe et al.
10,713,804 B2    7/2020  Wang et al.
(Continued)

FOREIGN PATENT DOCUMENTS

CN          110784722 A  *  2/2020  ............. H04N 19/44
CN          112562059 A  *  3/2021  ............. G06N 3/045

OTHER PUBLICATIONS

Levy, "Determining Local Depth from Structured Light Using a Regular Dot Grid", Technical Disclosure Commons, Oct. 61, 2019, 12 pages (Year: 2019).*
(Continued)

*Primary Examiner* — Henok Shiferaw
*Assistant Examiner* — Dion J Satcher
(74) *Attorney, Agent, or Firm* — DORITY & MANNING P.A.

(57) ABSTRACT

Provided are computing systems, methods, and platforms for using machine-learned models to generate a depth map. The operations can include projecting, using a dot illuminator, near-infrared (NIR) dots on the scene. The NIR dots can have a uniform pattern. Additionally, the operations can include capturing, using a single NIR camera, the projected NIR dots on the scene. Moreover, the operations can include generating a dot image based on the captured NIR dots on the scene. Furthermore, the operations can include processing the dot image with a machine-learned model to generate a depth map of the scene. Subsequently, the operations can further include evaluating the generated depth map of the scene and a ground truth depth map, and performing an action based on the evaluation.

20 Claims, 12 Drawing Sheets

(51) Int. Cl.
    *G06V 40/16*           (2022.01)
    *G06V 40/40*           (2022.01)

(52) U.S. Cl.
    CPC .............. *G06T 2207/10048* (2013.01); *G06T 2207/20081* (2013.01); *G06T 2207/30201* (2013.01)

(56)           References Cited

U.S. PATENT DOCUMENTS

| | | | |
|---|---|---|---|
| 10,846,871 | B2 | 11/2020 | Knorr et al. |
| 2011/0187819 | A1* | 8/2011 | Katz .................... H04N 13/128 |
| | | | 348/E13.001 |
| 2015/0381972 | A1* | 12/2015 | Kowdle .............. H04N 9/3191 |
| | | | 348/51 |
| 2017/0236286 | A1* | 8/2017 | Fanello ............ G06F 18/24323 |
| | | | 382/154 |
| 2020/0273192 | A1* | 8/2020 | Cheng ................. G06V 10/454 |
| 2021/0240808 | A1* | 8/2021 | Deore ................... G06V 40/45 |
| 2021/0350769 | A1* | 11/2021 | Lee .......................... G09G 5/37 |
| 2022/0024048 | A1* | 1/2022 | Ambrus ................ G01B 11/24 |

OTHER PUBLICATIONS

Jia, Tong, et al. "Depth measurement based on a convolutional neural network and structured light." Measurement science and technology 33.2 (2021): 025202. (Year: 2021).*

Riegler, Gernot, et al. "Connecting the dots: Learning representations for active monocular depth estimation." Proceedings of the IEEE/CVF conference on computer vision and pattern recognition. 2019. (Year: 2019).*

Nguyen, Hieu, Yuzeng Wang, and Zhaoyang Wang. "Single-shot 3D shape reconstruction using structured light and deep convolutional neural networks." Sensors 20.13 (2020): 3718. (Year: 2020).*

Barry et al., "At-Home Pupillometry using Smartphone Facial Identification Cameras", Conference on Human Factors in Computing Systems, Apr. 29-May 5, 2022, New Orleans, LA, United States, 12 pages.

Levy, "Determining Local Depth from Structured Light Using a Regular Dot Grid", Technical Disclosure Commons, Oct. 1, 2019, 12 pages.

* cited by examiner

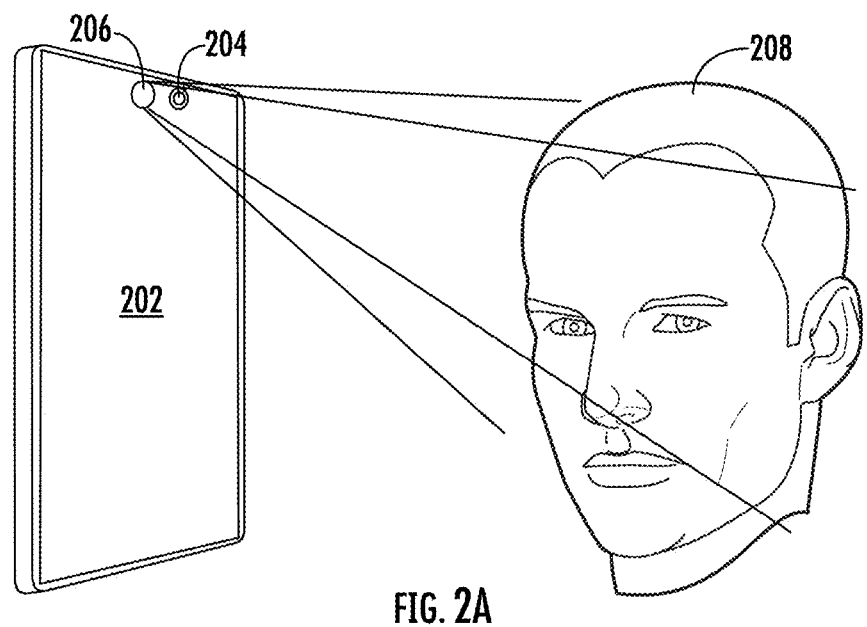
FIG. 2A
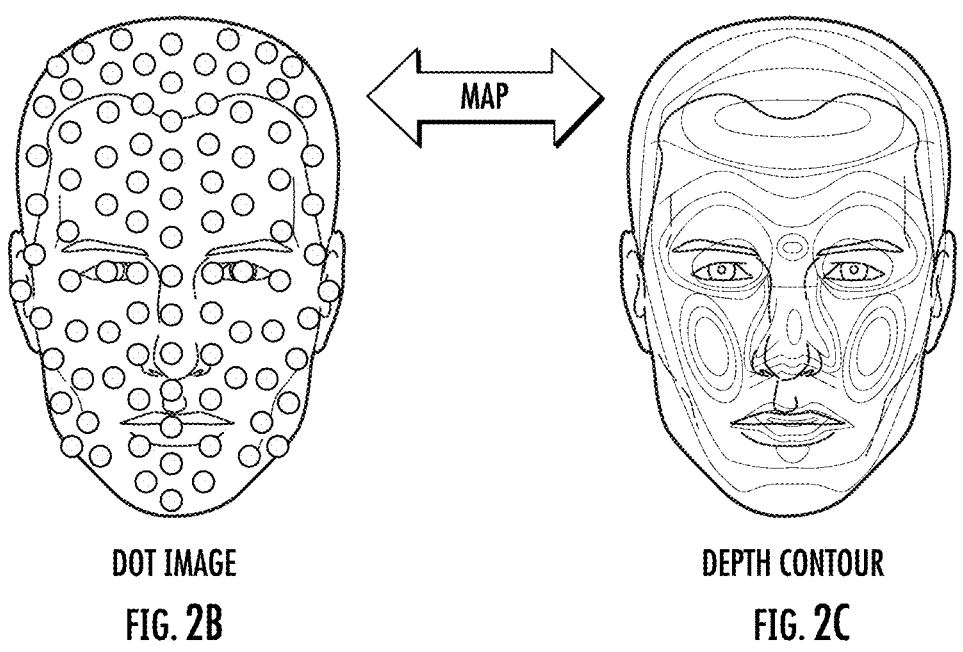
DOT IMAGE
FIG. 2B
MAP
DEPTH CONTOUR
FIG. 2C

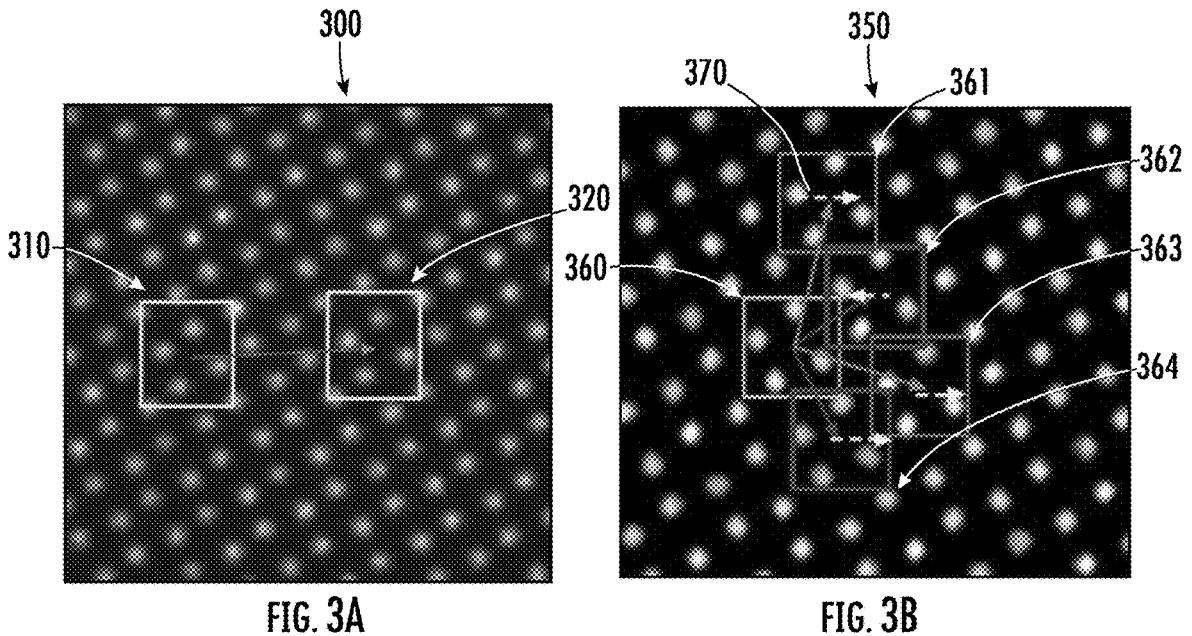
FIG. 3A                              FIG. 3B

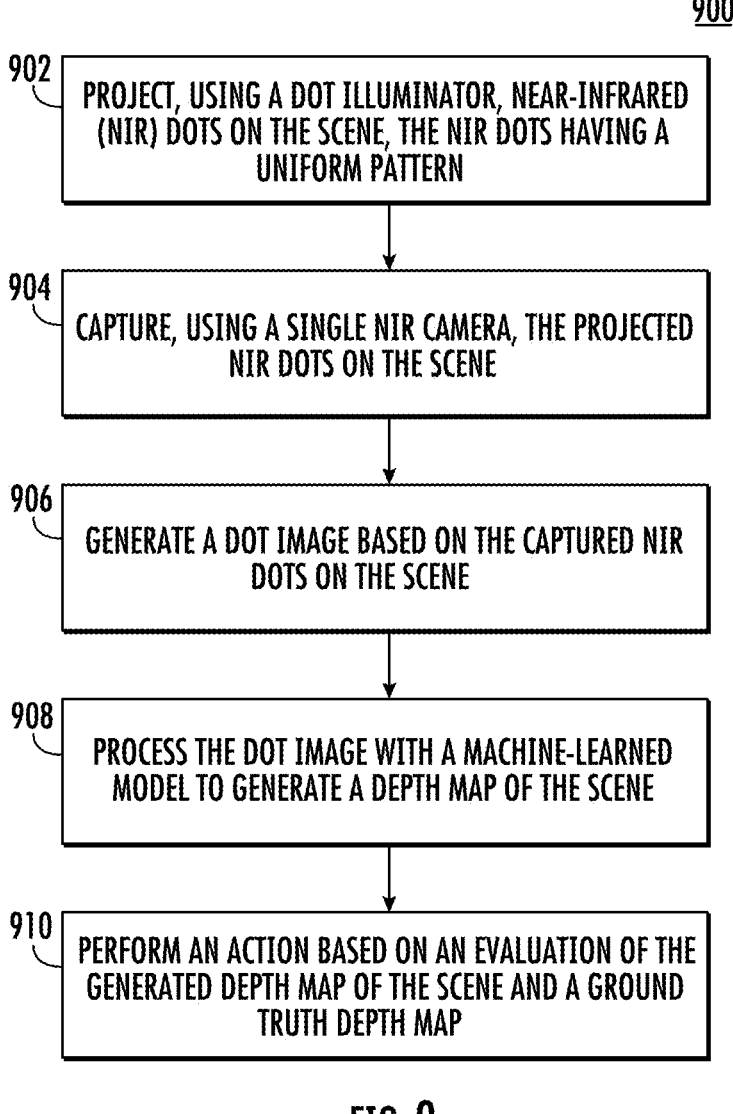

900

902   PROJECT, USING A DOT ILLUMINATOR, NEAR-INFRARED (NIR) DOTS ON THE SCENE, THE NIR DOTS HAVING A UNIFORM PATTERN

904   CAPTURE, USING A SINGLE NIR CAMERA, THE PROJECTED NIR DOTS ON THE SCENE

906   GENERATE A DOT IMAGE BASED ON THE CAPTURED NIR DOTS ON THE SCENE

908   PROCESS THE DOT IMAGE WITH A MACHINE-LEARNED MODEL TO GENERATE A DEPTH MAP OF THE SCENE

910   PERFORM AN ACTION BASED ON AN EVALUATION OF THE GENERATED DEPTH MAP OF THE SCENE AND A GROUND TRUTH DEPTH MAP

FIG. 9

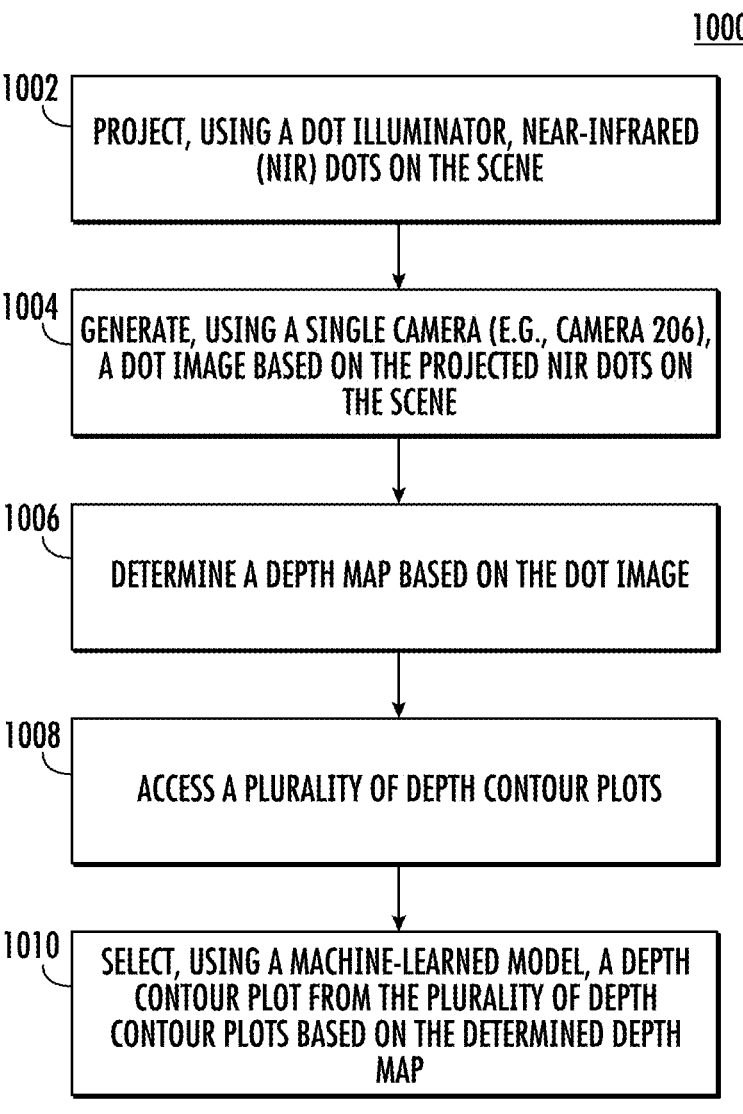

1000

1002 PROJECT, USING A DOT ILLUMINATOR, NEAR-INFRARED (NIR) DOTS ON THE SCENE

1004 GENERATE, USING A SINGLE CAMERA (E.G., CAMERA 206), A DOT IMAGE BASED ON THE PROJECTED NIR DOTS ON THE SCENE

1006 DETERMINE A DEPTH MAP BASED ON THE DOT IMAGE

1008 ACCESS A PLURALITY OF DEPTH CONTOUR PLOTS

1010 SELECT, USING A MACHINE-LEARNED MODEL, A DEPTH CONTOUR PLOT FROM THE PLURALITY OF DEPTH CONTOUR PLOTS BASED ON THE DETERMINED DEPTH MAP

FIG. 10

DEPTH ESTIMATION USING A SINGLE NEAR-INFRARED CAMERA AND DOT ILLUMINATOR

FIELD

The present disclosure relates generally to automated recognition systems. More particularly, the present disclosure relates to using depth estimation with a single camera to determine patterns for authentication applications.

BACKGROUND

Pattern recognition is the automated recognition of patterns in data. Some modern approaches to pattern recognition include the use of machine learning, due to the increased availability of data and improved processing power. Pattern recognition systems are commonly trained from labeled training data. In machine learning, pattern recognition is the assignment of a label to a given input value. Pattern recognition is generally categorized according to the type of learning procedure used to generate the output value.

A facial recognition system is a technology capable of matching a human face from image data typically employed to authenticate users. In some instances, the system can match a human face by measuring features from the image data. Facial recognition systems have seen wider uses in recent times on smartphones.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for generating a depth map of a scene. The method can include projecting, using a dot illuminator, near-infrared (NIR) dots on the scene. The NIR dots can have a uniform pattern. For example, the uniform pattern can be a uniform dot matrix pattern. Additionally, the method can include capturing, using a single NIR camera, the projected NIR dots on the scene. Moreover, the method can include generating a dot image based on the captured NIR dots on the scene. Furthermore, the method can include processing the dot image with a machine-learned model to generate a depth map of the scene.

In some instances, the dot image is a single dot image, and the depth map is generated based on the single dot image.

In some instances, the machine-learned model is trained on a training dataset of a plurality of training examples. Each training example in the plurality of training examples can have a dot image and a ground truth depth map.

In some instances, the method can further include comparing the generated depth map of the scene with a ground truth depth map to generate a comparison score. Additionally, the method can include classifying the scene as a spoof representation classification when the comparison score exceeds a threshold value. Moreover, the method can include rejecting an authentication request based on the spoof representation classification.

In some instances, the method can include evaluating the generated depth map of the scene and a ground truth depth map. Additionally, the method can include performing an action based on the evaluation. For example, the action performed can be to unlock a device. Alternatively, the action can be to authenticate a user.

In some instances, the NIR dots can be projected on the scene in a repeating dot pattern, and the method can further include determining a disparity of the repeating dot pattern in the dot image. The depth map can be generated based on the disparity of the repeating dot pattern in the dot image. For example, the disparity is associated with a foreshortening effect, and the disparity is determined by calculating distance between at least two dots in the dot image.

In some instances, the method for generating the depth map of the scene includes selecting an area of the dot image. Additionally, the method includes computing an observed vector for the area of the dot image. Moreover, the method includes comparing the observed vector to a baseline vector associated with the area to determine the local disparity of the area. Furthermore, the method includes calculating a local gradient of depth for the area based on the comparison. The generation of the depth map of the scene can be based on the local gradient of depth for the area.

In some instances, the generation of the depth map of the scene can occur without performing a calibration between the dot illuminator and the single NIR camera.

In some instances, the calibration can be performed during a training stage of the machine-learned model by capturing data from a plurality of devices with different calibration. For example, the plurality of devices can have a similar model type (e.g., similar smartphone model type and/or version).

Another example aspect of the present disclosure is directed to a computing system for performing inference. The computing system can include one or more processors and memory. The memory can store a machine-learned model and instructions that, when executed by the one or more processors, cause the computing system to perform operations. The operations can include projecting, using a dot illuminator, near-infrared (NIR) dots on the scene, the NIR dots having a uniform pattern. Additionally, the operations can include capturing, using a single NIR camera, the projected NIR dots on the scene. Moreover, the operations can include generating a dot image based on the captured NIR dots on the scene. Furthermore, the operations can include processing the dot image with a machine-learned model to generate a depth map of the scene.

In some instances, the operations can include comparing the generated depth map of the scene with a ground truth depth map to generate a comparison score. Additionally, the operations can include classifying the scene as a spoof representation classification when the comparison score exceeds a threshold value. Moreover, the operations can include rejecting an authentication request based on the spoof representation classification.

Another example aspect of the present disclosure is directed to a computer-implemented method for training a machine-learning model. The method can include obtaining training input comprising a dot image and a ground truth depth map, the dot image being captured using a single camera. Additionally, the method can include processing the dot image with the machine-learning model to generate a predicted depth map. Moreover, the method can include evaluating a loss function based on the predicted depth map and the ground truth depth map. Furthermore, the method can include modifying one or more parameters of the machine-learning model based on the evaluation of the loss function.

In some instances, the ground truth depth map is generated using at least two cameras that are calibrated to each other.

In some instances, the machine-learning model is trained offline, and the ground truth depth map is generated by solving a series of partial differential equations (PDEs).

In some instances, the ground truth depth map is generated using time-of-flight (ToF) depth estimation, a structured-light depth estimation, or a stereo reconstruction.

Another example aspect of the present disclosure is directed to a computer-implemented method for determining a depth map of a scene. The method includes projecting, using a dot illuminator, near-infrared (NIR) dots on the scene. Additionally, the method includes generating, using a single camera, a dot image based on the projected NIR dots on the scene. For example, the single camera can be a single NIR camera. Moreover, the method includes determining a depth of the scene based on the dot image. Furthermore, the method includes accessing a plurality of depth contour plots, wherein the plurality of depth contour plots can be associated with a plurality of dot images. Subsequently, the method includes selecting, using a machine-learned model, a depth contour plot from the plurality of depth contour plots based on the determined depth of the scene.

In some instances, the method includes evaluating the selected depth contour plot and the determined depth of the scene. Additionally, the method can include performing an action based on the evaluation. For example, the action performed can be to unlock a device. In another example, the action performed can be authenticating a user.

In some instances, the method can include capturing, using the single camera, the projected NIR dots on the scene to generate the dot image.

In some instances, when the NIR dots are being projected on the scene in a repeating dot pattern, the method can further include determining a disparity of the repeating dot pattern in the dot image. The depth of the scene can be determined based on the disparity of the repeating dot pattern in the dot image. For example, the disparity can be associated with a foreshortening effect, and the disparity can be determined by calculating distance between at least two dots in the dot image.

In some instances, the determination of the depth of the scene can include selecting an area of the dot image. Additionally, the method can include computing an observed vector for the area of the dot image. Moreover, the method can include comparing the observed vector to a baseline vector associated with the area to determine the local disparity of the area. Furthermore, the method can include calculating a local gradient of depth for the area based on the comparison. The determination of the depth can be based on the local gradient of depth for the area.

In some instances, the determination of the depth of the scene can occur without performing a calibration between the dot illuminator and the single camera. Additionally, the calibration can be performed during a training stage of the machine-learned model, the training stage includes capturing data from a plurality of devices with different calibration. For example, the plurality of devices can have a similar model type (e.g., similar smartphone model and operating system version). Moreover, the machine-learned model can be trained offline from collected data.

In some instances, the plurality of depth contour plots can be generated using time-of-flight (ToF) depth estimation. In some instances, the plurality of depth contour plots can be generated using structured-light depth estimation. In some instances, the plurality of depth contour plots can be generated using stereo reconstruction.

Another example aspect of the present disclosure is directed to a computing system. The computing system can include one or more processors and one or more non-transitory computer-readable media that collectively store instructions. When the instructions are executed by one or more processors, it causes the computing system to perform operations. The operations can include projecting, using a dot illuminator, near-infrared (NIR) dots on the scene. Additionally, the operations can include generating, using a single camera, a dot image based on the projected NIR dots on the scene. Moreover, the operations can include determining a depth of the scene based on the dot image. Furthermore, the operations can include accessing a plurality of depth contour plots. Subsequently, the operations can include selecting, using a machine-learned model, a depth contour plot from the plurality of depth contour plots based on the determined depth of the scene.

In some instances, the operations can include evaluating the selected depth contour plot and the determined depth of the scene. Additionally, the operations can include performing an action based on the evaluation, wherein the action performed is to unlock a device.

In some instances, when the NIR dots are being projected on the scene in a repeating dot pattern, the operations can further include determining a disparity of the repeating dot pattern in the dot image. The depth of the scene is determined based on the disparity of the repeating dot pattern in the dot image.

In some instances, a first depth contour plot from the plurality of depth contour plots can be paired with a ground truth depth of the scene. The computing system can select the first depth contour plot based on the determined depth of the scene being similar to the ground truth depth of the scene.

Another example aspect of the present disclosure is directed to one or more non-transitory computer-readable media that collectively store a machine-learned recognition system. The recognition system has been learned by performance of operations. The operations can include projecting, using a dot illuminator, near-infrared (NIR) dots on the scene. Additionally, the operations can include generating, using a single camera, a dot image based on the projected NIR dots on the scene. Moreover, the operations can include determining a depth of the scene based on the dot image. Furthermore, the operations can include accessing a plurality of depth contour plots. Subsequently, the operations can include selecting, using a machine-learned model, a depth contour plot from the plurality of depth contour plots based on the determined depth of the scene.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 2A-2C depicts an illustration of an example technique for determining depth of a scene using a single NIR camera and dot illuminator according to example embodiments of the present disclosure.

FIG. 3A depicts an illustration of a repeating dot pattern generated by an IR dot illuminator according to example embodiments of the present disclosure.

FIG. 3B depicts an illustration of the repeating dot patterns in different areas according to example embodiments of the present disclosure.

FIG. 9 depicts a flow chart diagram of an example method for generating a depth map according to example embodiments of the present disclosure.

FIG. 10 depicts a flow chart diagram of an example method for determining a depth map of a scene according to example embodiments of the present disclosure.

Figure 1A:
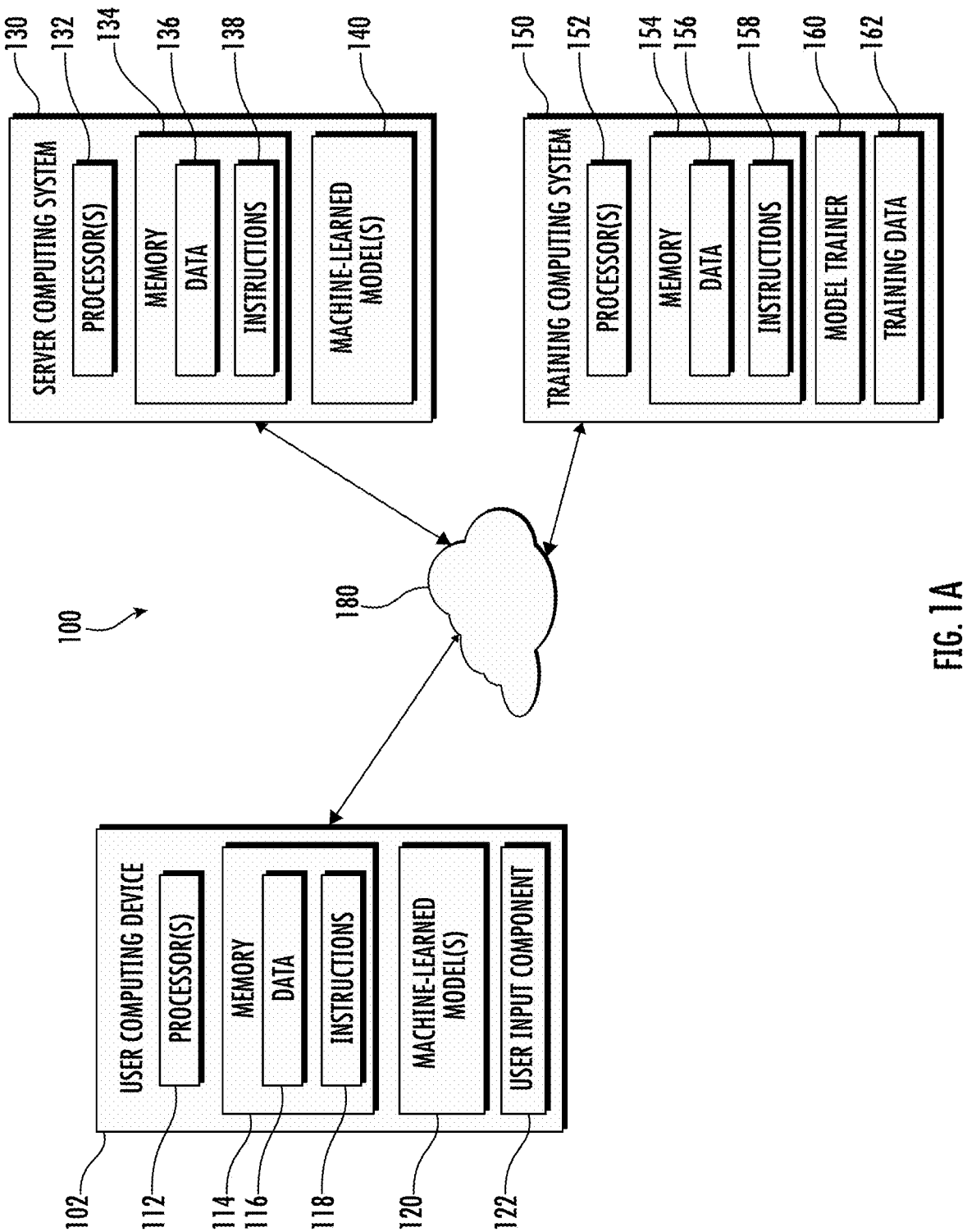
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to depth estimation using a single near-infrared (NIR) camera and dot illuminator. The techniques described herein can determine estimations of a depth map directly from a single NIR image. For example, the NIR image can be a dot image that captures scenes illuminated by a dot projector. In some instances, the system (e.g., automated recognition system, authentication system) can generate (e.g., estimate) the depth map of a scene by illuminating the scene with a NIR dot projector and by using a single NIR camera that captures the resulting dot-matrix image. The use of a single camera and a single dot projector to estimate the depth map of a scene can significantly reduce the complexity, bill of materials, and calibration procedures for various face-based authentication applications (e.g., smartphone unlock, laptop unlock, door unlock, driver monitoring, automotive entertainment).

For example, face-based recognition technology has been implemented to enable users to unlock smartphones and other devices by looking at the device. Presentation attacks attempt to spoof face-based recognition technology using a photo of the true user. As explained in the techniques described herein, the presentation attacks can be prevented by determining a depth map using an NIR camera.

In conventional systems, a depth map can be computed using at least two cameras, but this requires the cameras to be calibrated. For example, the depth map can be computed by solving for the stereo match between NIR stereo images taken by at least two cameras of a scene illuminated by a dot projector. While stereo matching under active illumination is a well-studied problem, a key challenge is obtaining accurate calibration parameters for the cameras at any instant of time. When the cameras lose calibration, as the cameras do periodically, the depth calculation becomes erroneous. Depth-quality metrics to trigger auto-calibration partially addresses calibration problems, but not in all situations. Therefore, by just using a single camera, the system described herein does not need to continuously calibrate the cameras.

According to some embodiments, the system can estimate the depth map of a scene by using a single NIR dot projector (e.g., dot emitter) to project a plurality of dots with a repeating dot pattern on the scene. Additionally, the system can utilize a single NIR camera to capture the resulting image (e.g., dot image).

According to some embodiments, one of the important improvements of the techniques described herein is that the system may not require calibration between projector and the camera system. For example, the system can recognize a pattern or authenticate a user without having to calibrate the projector and the camera system. Additionally, the system can utilize a machine-learned model that can be implicitly learnt offline from collected data. Moreover, the system can be made robust to the calibration drifts by capturing data from several devices of the same model type having different calibration. Furthermore, in order to generate the depth map, the system can utilize the foreshortening of inter dot distances in the local neighborhood to compute depth.

These improvements (e.g., not needing calibration) reduce usage of computing resources, such as memory and processing power. Additionally, by being able to authenticate users with a single camera, the system reduces the cost and equipment for authentication systems.

The techniques described herein can be implemented in a variety of applications. For example, the techniques can be utilized by a device (e.g., smartphone, laptop) for face unlock, where a single dot emitter and one NIR camera can simplify the design considerably, with less issues of calibration. Additionally, due to the usage of just one camera and one dot projector, the sensors can be put under the display. Additionally, the techniques can be utilized by smart home devices (e.g., smart speakers, smart displays, streaming devices, thermostats, smoke detectors, routers and security systems including smart doorbells, cameras and smart locks) that utilizes face authentication features. Moreover, the techniques can be utilized by vehicles for authentication purposes (e.g., to unlock the vehicle) and driver monitoring.

With reference now to the Figures, example embodiments of the present disclosure will be discussed in further detail.

Example Devices and Systems Having Machine-Learned Models

FIG. 1A depicts a block diagram of an example computing system 100 that performs pattern recognition according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform a parallel pattern recognition process across multiple instances of the generated dot image).

More particularly, the machine-learned model can determine and match patterns in a generated dot image to known images in order to authenticate users. For example, the dot image can be generated by a single camera based on projected NIR dots on a scene (e.g., face of a user). The machine-learned model can determine a depth of the scene based on the dot image. Additionally, the system can access a plurality of depth contour plots. Each plot in the plurality of depth contour plots can be labeled offline and be associated with a specific dot image. The specific dot image for each depth contour plot can be the ground truth. Moreover, the machine-learned model can select a depth contour plot from the plurality of depth contour plots based on the determined depth of the scene.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 130 as a portion of a web service (e.g., an authentication service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a camera (e.g., NIR camera), or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIG. 7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, ground truth of dot images and the corresponding depth contour plots. For example, the training data can include human-labeled depth contour plots with a corresponding dot image. Additionally, the training data can include plurality of depth contour plots that are associated with a plurality of dot images. Each depth contour plot can be associated with a respective dot image.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data.

The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be sensor data (e.g., NIR data). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an image compression task. The input may include image data and the output may comprise compressed image data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data or dot image data for one or more images and the task is an image processing task. For example, the image processing task can be image classification, where the output is a set of scores, each score corresponding to a different object class and representing the likelihood that the one or more images depict an object belonging to the object class. For example, the authentication of a user can be based on the likelihood of the dot image resembling the depth contour plot.

In some cases, the image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
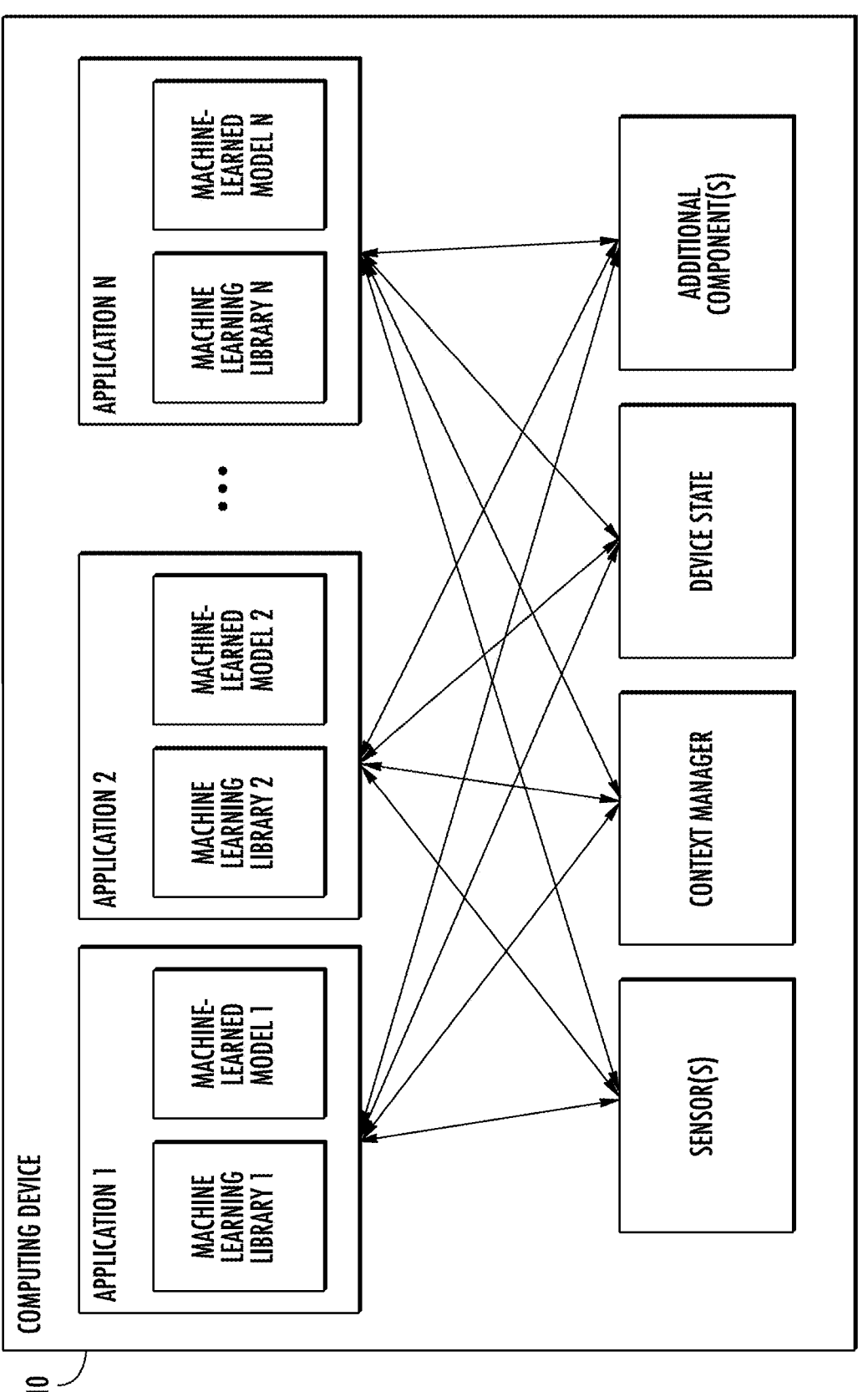
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include an authentication application, a text messaging application, an email application, a dictation application, a virtual keyboard application, a browser application, and so on.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
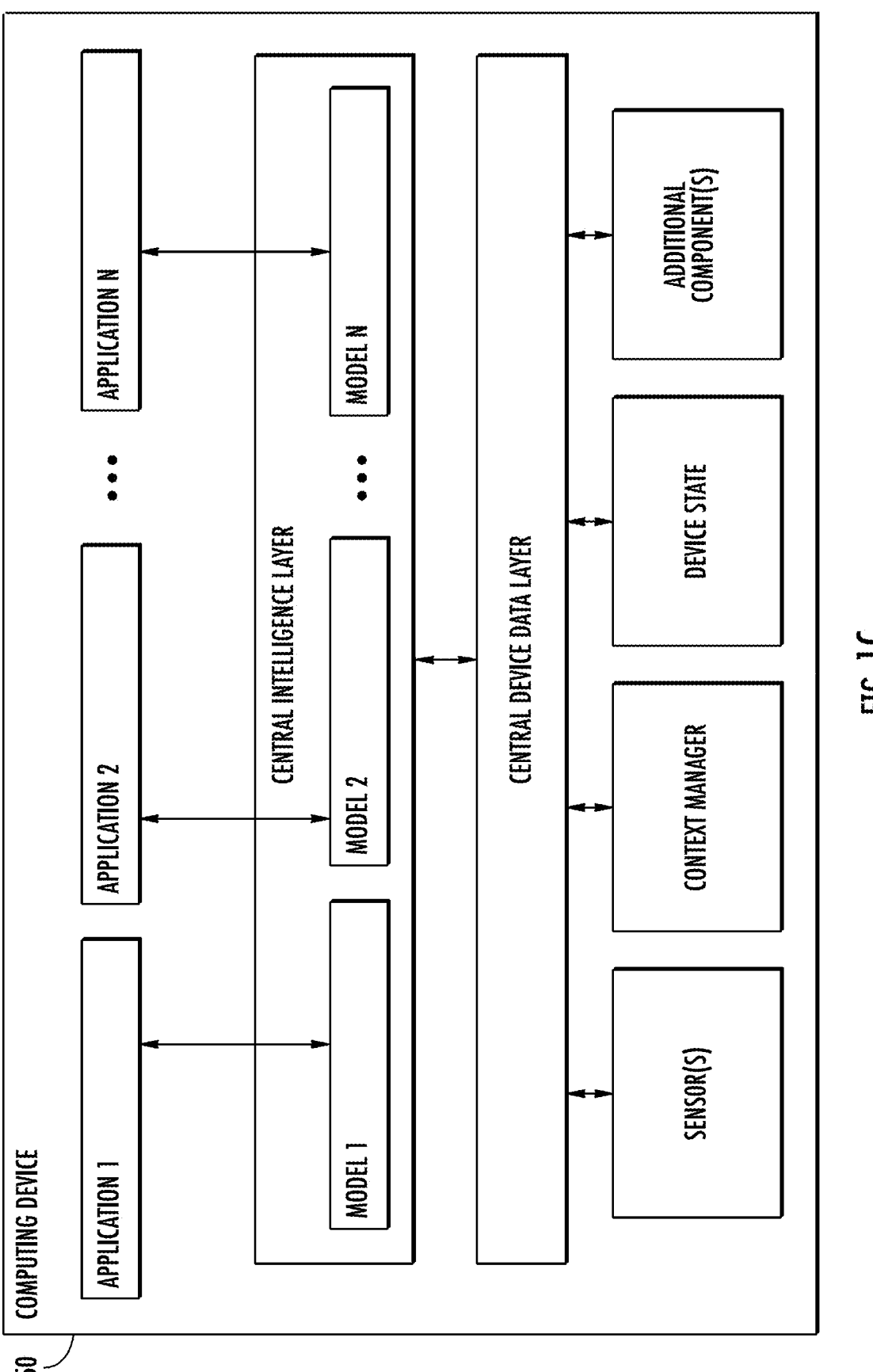
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include an authentication application, text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

FIGS. 2A-C illustrates finding depth within a scene using a single NIR camera and dot illuminator according to example embodiments of the present disclosure. In FIG. 2A, a dot illuminator 204 can be mounted on a device 202 (e.g., user device 102, a smartphone). The dot illuminator 204 can project (e.g., emit) a uniform dot matrix of invisible near-infrared light to a scene 208 (e.g., a user's face).

Subsequently, an NIR camera 206 can capture the resulting dot image as shown in FIG. 2B. The three-dimensional curves of the scene reflect the NIR dots such that the NIR dots may no longer have the initial uniformity of their spatial distribution.

The particular, non-uniform spatial dot distribution as captured in the dot image can be a nearly unique representation of the subject. The dot image can be used to recognize the subject (e.g., for the purposes of authentication), by training a machine learning model to map the dot image to a depth contour plot as illustrated in FIG. 2C.

During training process of the machine-learned model (e.g., machine-learned models 120, 140 in FIGS. 1A-C), the machine learned model can be supplied with depth contour plots obtained using conventional depth-finding techniques, e.g., time-of-flight (ToF) depth estimation, structured-light depth estimation, stereo reconstruction, and so on. During the inference process, a single camera suffices to map the dot image to a depth contour plot by using the machine-learned model. Calibration of the transmit and receive dot matrices (e.g., between the dot illuminator and the camera) may be avoided and effectively be absorbed into the training process.

The technique described herein can be made robust to calibration drift by using training data from several devices of the same family. Examples of machine learning models suitable for the mapping task include generative adversarial networks (GAN), autoencoder networks, and so on. A presentation (e.g., face-spoofing) attack can be detected because a flat, printed photograph of the user lacks depth and is unable to produce the uniquely non-uniform dot image characteristic of the user's true three-dimensional face.

Further to the descriptions above, a user can be provided with controls allowing the user to make an election as to both if and when systems, programs, or features described herein may enable the collection of user information (e.g., image data, preferences, location data). In addition, certain data may be modified before being stored or used so that personally identifiable information is removed. For example, a user's identity may be treated so that no personally identifiable information can be determined for the user, or a user's geographic location may be generalized where location information is obtained (such as to a city, ZIP code, or state level) so that a particular location of a user cannot be determined. Thus, the user may have control over what information is collected about the user, how that information is used, and what information is provided to the user.

Determining Depth Gradients from Structured Light
Using a Dot Image

According to some embodiments, the system can determine depth gradients (e.g., local depth) of a scene from structured light using a dot grid pattern and a single receiving camera. A patterned illuminator with a repeating dot pattern can provide a structured light that is used to generate depth information. Because any patch of dots can be expected to repeat at a known horizontal distance, an auto-correlation of the image with itself produces peaks along with these repetitions. By finding the disparity from such a peak to its expected location, the system can measure the local disparity between pairs of patches in the image. This process produces a local depth map, which is effectively the gradient of the true depth map. This map can be calculated with low complexity, calibrated with simple captures, and is robust to a range of miscalibrations.

More specifically, a dot image (e.g., as illustrated in FIG. 2B) can be generated from capturing an illuminated pattern projected on a flat plane. A calibration map can be generated to estimate a repetition of a patch in the image along a baseline vector between an illuminator (e.g., an IR dot illuminator 204) and a camera (e.g., an IR camera 206) by using an angle and pitch between dots. The calibration map can then be applied to a scene (e.g., a user's face) captured with the illuminator, and the image is divided into patches to calculate a z-scored template to be matched. Autocorrelation is applied within +/−n pixels from the baseline vector to find the distance with the best match (local disparity). A gradient vector is determined by repeating the disparity calculation process with calibrations along different initial vectors to generate the local disparity along multiple axes. Finally, a depth map can be generated, by the machine-learned models 120, 140, from an iterative integration of the gradient map using an image pyramid technique.

FIG. 3A depicts an illustration 300 of a repeating dot pattern generated by an IR dot illuminator (e.g., dot illuminator 204) according to example embodiments of the present disclosure. In this example, the same four dot patches are repeated approximately a few pixels away in the x-axis and approximately a few pixels away in the y-axis as shown in box 310 and 320. The predictable repetition of certain IR dot illuminators means that they can be used as their own reference under this disclosure to produce a local depth map.

FIG. 3B depicts an illustration 350 of the repeating dot patterns in different areas according to example embodiments of the present disclosure. Illustration 350 illustrates the four closest repetitions of the dot pattern, in pairs with 90-degree relative orientation. The first box 360 represents an initial reference patch pattern. The other boxes 361, 362, 363, 364 represent the replicated pattern along multiple expected vectors. The arrows 370 depict the possible disparity vectors calculated relative to a calibrated repetition location. For a perfectly repeated pattern, any patch of the pattern will be replicated along multiple expected vectors. If the pattern is imaged by a camera separated along some baseline, it will shift due to stereo parallax (as the conventional structured light signal would be). The system, using the machine-learned model 120, 140, uses autocorrelation to compute the actual locations of these repetitions. By computing the observed vector and comparing its position versus the expected known vector along the baseline, the system, using the machine-learned model 120, 140, can determine the local disparity of the pattern. The local disparity value can be interpreted as the local gradient of depth.

According to some embodiments, an idealized pattern may not need calibration, save for knowledge of the spacing and rotation of the dots. In reality, there can be local non-uniformities due to lens distortion and angular distortion of the pattern. So, to calibrate the image, the system uses knowledge of the angle and pitch between dots (which can be easily measured from a single capture), to estimate where the system will see the patch repetition along the baseline vector between illuminator and camera. The system can calibrate the lens distortion and angular distortion of the pattern by taking an image of the pattern on a flat plane at some distance z. Then, the system can divide the image into patches and compute the local vectors to the nearest repetitions. These vectors should vary slowly over the image field, as depicted in FIGS. 3A-3B.

Figure 4:
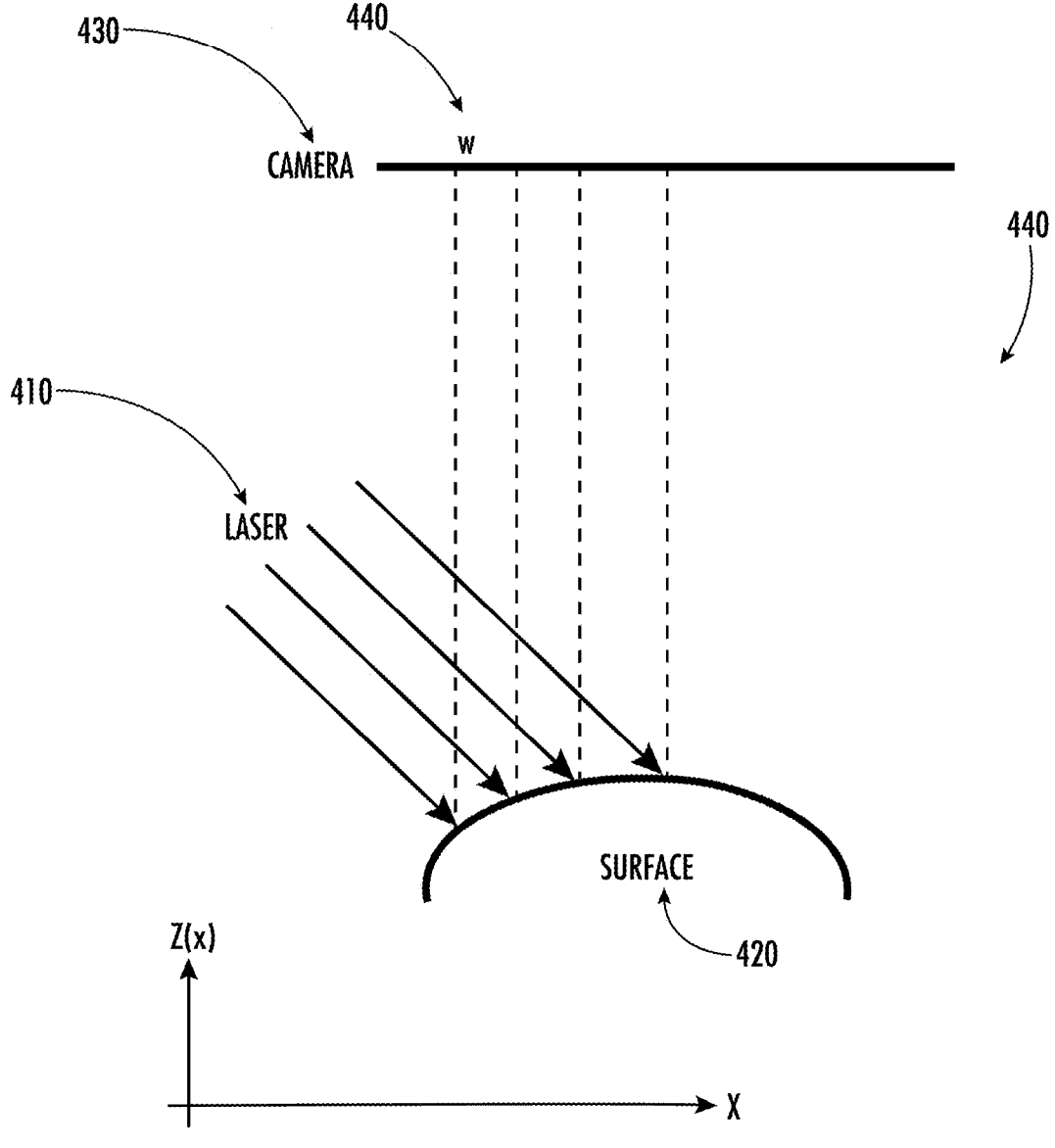
FIG. 4 depicts an illustration of the imaging process according to example embodiments of the present disclosure.

FIG. 4 depicts an illustration 400 of the imaging process according to example embodiments of the present disclosure. For example, the imaging process can generate a two-dimensional rendering of a three-dimensional (3D) object. Regularly spaced dots from a projector 410 illuminate the surface of a 3D object 420, which is further imaged by a NIR camera 430. For example, the spacing between two consecutive dots can be w 440.

Figure 5:
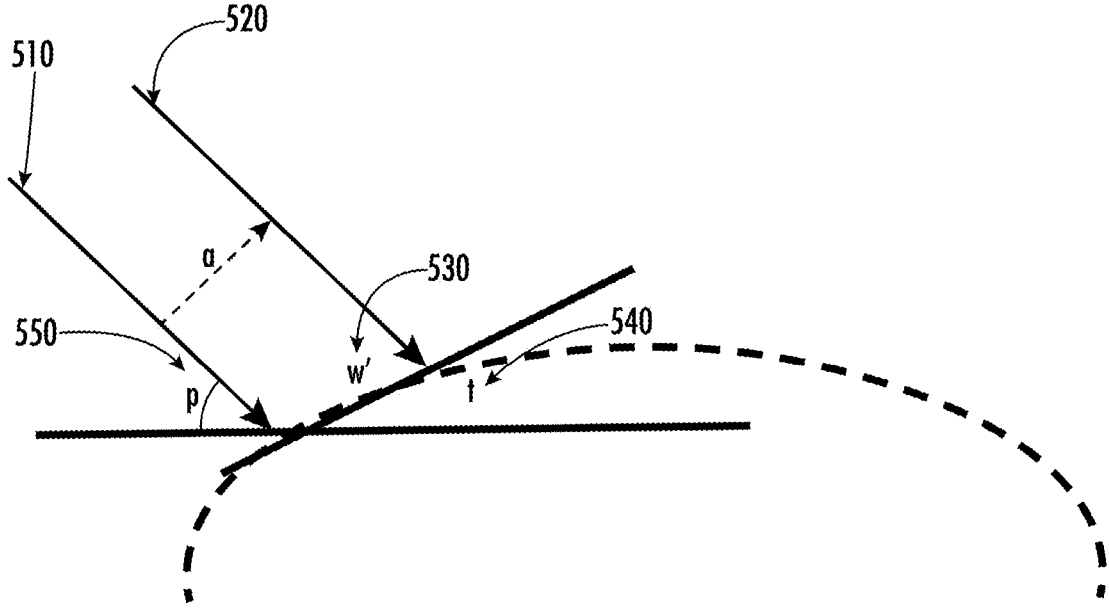
FIG. 5 depicts an illustration of the geometry between two consecutive dots on a three-dimensional object according to example embodiments of the present disclosure.

FIG. 5 depicts an illustration 500 of the geometry between two consecutive dots (e.g., first dot 510, second dot 520) on a three-dimensional object according to example embodiments of the present disclosure. For example, the illustration of the geometry relating the distance w' 530 between the first dot 510 and the second dot 520 on the 3D object, the incline of the object t 540, the actual gap between two rays, and their angle of incidence, p 550.

In the example depicted in FIG. 5, $w = w'\cos(t)$ and $w' = a/\sin(p+t)$

Simplifying, $w = a\cos(t)/\sin(p+t)$.

Hence, $t = \arctan((a/w)\sec(p) - \tan(p))$

Note that a and p are constants for a given camera and emitter.

Figure 6:
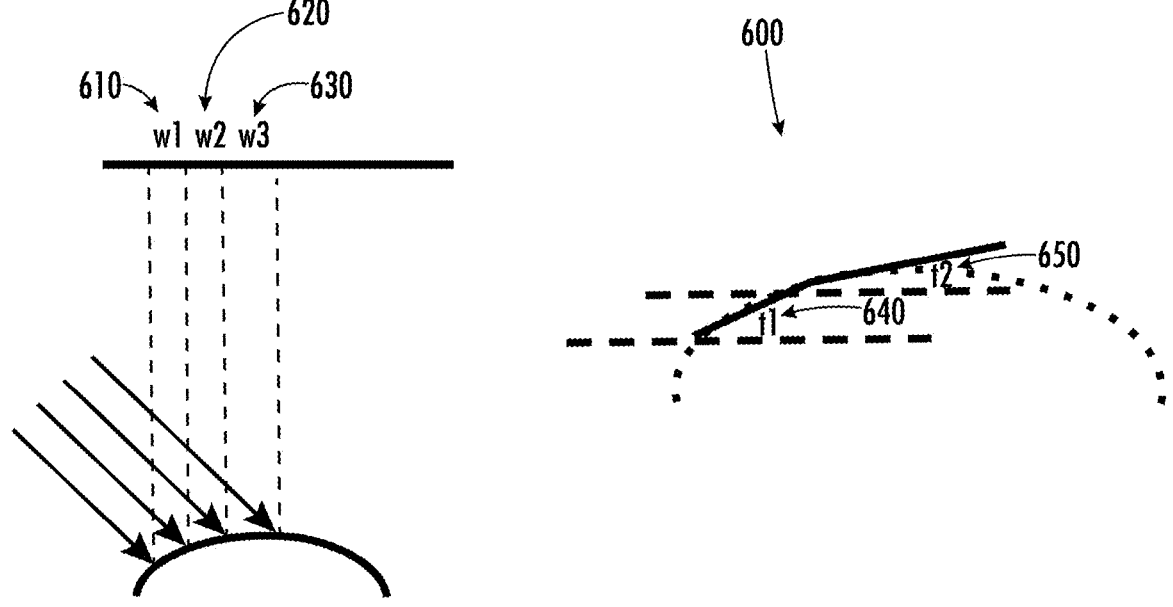
FIG. 6 depicts an illustration of the geometry of the dots being projected on a scene according to example embodiments of the present disclosure.

FIG. 6 depicts an illustration 600 of the geometry of the dots being projected on a scene according to example embodiments of the present disclosure. For example, the successive interdot distance, w1 610, w2 620, w3 630 and so on are related to the incline of the 3D surface, t1 640, t2 650, t3, and so on. Additionally, the surface incline values t1, t2, t3, etc. are related to the inter-dot distances w1, w2, w3, as:

$$t1 = \arctan((a/w1)\sec(p) - \tan(p)),$$

$$t2 = \arctan((a/w2)\sec(p) - \tan(p)),$$

$$t3 = \arctan((a/w3)\sec(p) - \tan(p)), \text{ and so on.}$$

Thus, with the knowledge of the inter-dot distances, the system, using machine-learned model 120, 140 can estimate the local gradient of the surface. Using classical methods in computer vision, the system estimates the depth map by solving a series of partial differential equations (PDEs) constructed from the above formulas. In some instances, the system can adopt techniques as depicted in FIG. 6 to solve the depth estimation problem.

Using the techniques described herein, the system utilizes an integrated approach of estimating the depth from dot images, using a deep neural network to solve PDEs efficiently.

Example Model Arrangements

Figure 7:
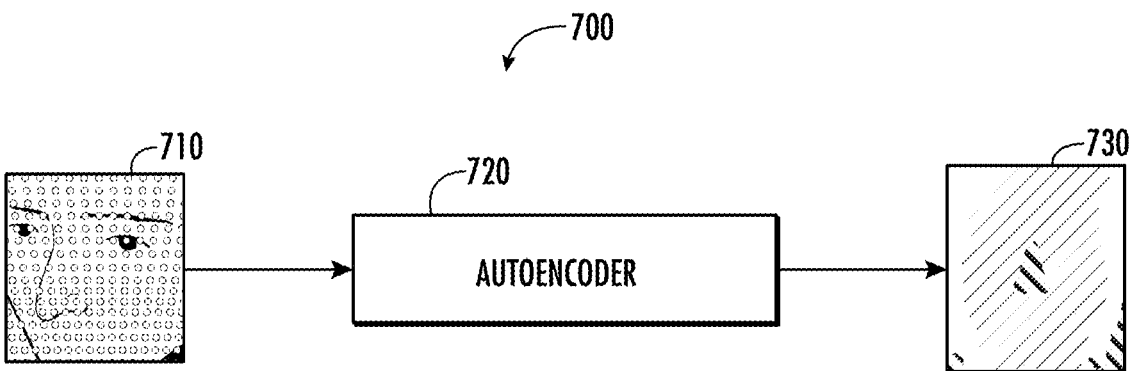
FIG. 7 illustrates the overall flow of an example machine-learned model using depth estimation algorithm according to example embodiments of the present disclosure.

FIG. 7 illustrates the overall flow 700 of an example machine-learned model using depth estimation algorithm according to example embodiments of the present disclosure. In some implementations, the machine-learned models 120, 140 can be trained to receive a dot image and a corresponding depth contour map. In some instances, a thumbnail 710 of the NIR dotted image can be inputted into an autoencoder 720 that estimates the depth thumbnail 730. The autoencoder 720 can generate a depth thumbnail.

In some instances, the system can thumbnail the dot images. In training, the system can pair the generated depth thumbnail with the thumbnails from the ground truth depth generated from a machine-learned pipeline (e.g., an ultra-depth pipeline). During inference, the autoencoder 720 can estimate the depth from the dotted NIR thumbnail.

Figure 8:
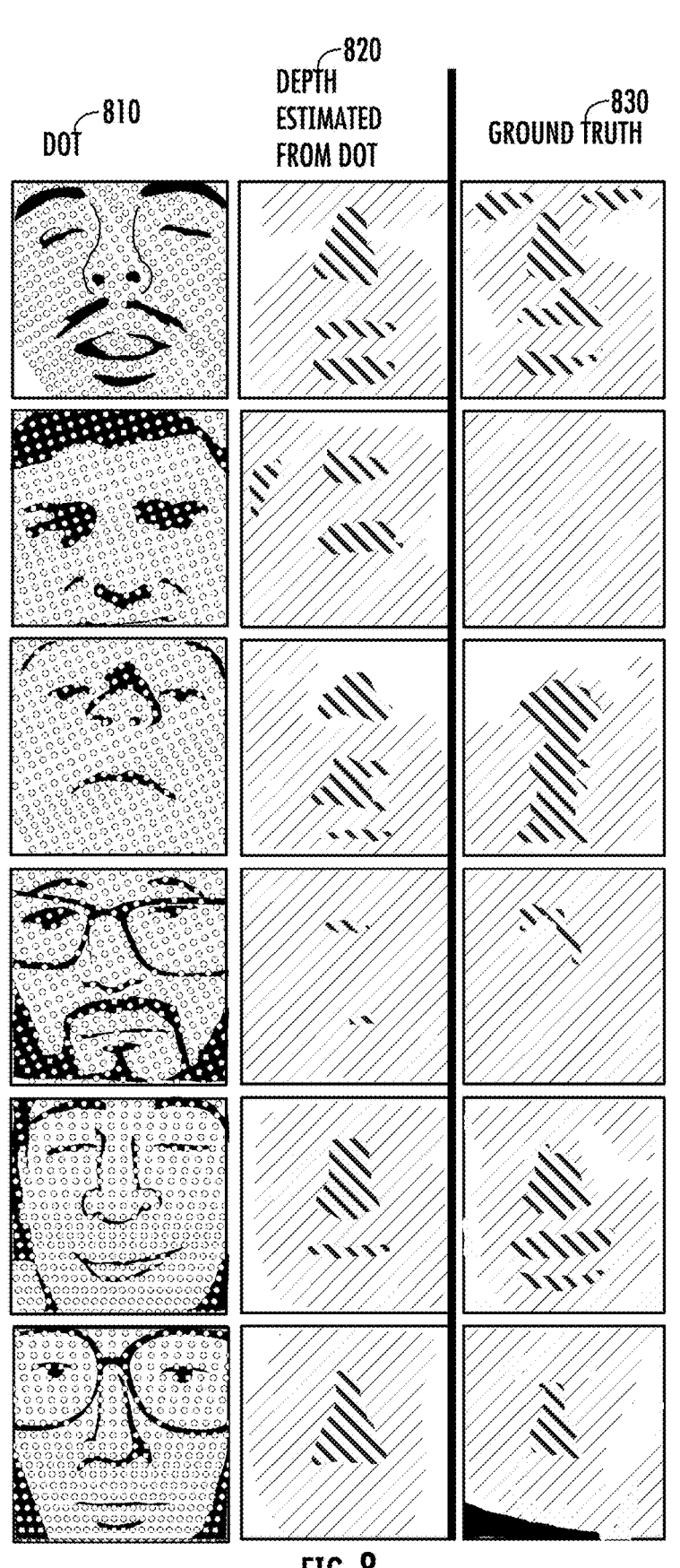
FIG. 8 illustrates examples 800 of depth maps 820 estimated from dot images 810 according to example embodiments of the present disclosure.

FIG. 8 illustrates examples 800 of depth maps 820 estimated from dot images 810 according to example embodiments of the present disclosure. Additionally, the depth maps can be compared to the actual ground truth depth maps 830. As illustrated in the examples 800, the overall geometry of the face objects and spoofs (paper prints of faces) can be estimated correctly using the techniques described herein.

Example Methods

FIG. 9 depicts a flow chart diagram of an example method for generating a depth map according to example embodiments of the present disclosure. Although FIG. 9 depicts steps performed in a particular order for purposes of illustration and discussion, the methods of the present disclosure are not limited to the particularly illustrated order or arrangement. The various steps of method 900 can be omitted, rearranged, combined, and/or adapted in various ways without deviating from the scope of the present disclosure.

At 902, a computing system can project, using a dot illuminator (e.g., dot illuminator 204), near-infrared (NIR) dots on a scene. In some instances, the computing system at 902 can be the user computing device 102 described in FIG. 1A. Additionally, the NIR dots can have a uniform pattern. For example, the uniform pattern can be a uniform dot matrix pattern. Moreover, in some instances, the face of a user can be an example of a scene.

At 904, the computing system can capture, using a single NIR camera (e.g., camera 206), the projected NIR dots on the scene. In some instances, the single camera can be a single NIR camera. FIGS. 2A-C depicts an example of how the dot image is generated based on the projected dots on the face of a user.

At 906, the computing system can generate a dot image based on the captured NIR dots on the scene. FIGS. 2A-C describe an example technique for generating a dot image based on captured dots.

In some instances, the dot image can be a single dot image, and the depth map generated at 908 can be based on the single dot image.

At 908, the computing system can process the dot image with a machine-learned model to generate a depth map of the scene.

In some instances, the NIR dots can be projected on the scene in a repeating dot pattern, and the computing system can further determine a disparity of the repeating dot pattern in the dot image. The depth map can be generated based, in part, on the disparity of the repeating dot pattern in the dot image. For example, the disparity can be associated with a foreshortening effect, and the disparity can be determined by calculating distance between at least two dots in the dot image.

In some, the depth map of the scene can be generated by the computing system (e.g., using the machine-learned model, selecting an area of the dot image. Additionally, the computing system can compute an observed vector for the area of the dot image. Moreover, the computing system can compare the observed vector to a baseline vector associated with the area to determine the local disparity of the area. Furthermore, the computing system can calculate a local gradient of depth for the area based on the comparison. The generation of the depth map of the scene can be based on the local gradient of depth for the area.

In some instances, the generation of the depth map of the scene occurs without performing a calibration between the dot illuminator and the single NIR camera.

At 910, the computing system can perform an action based on an evaluation of the generated depth map and a ground truth depth map. In some instances, the computing system can evaluate the generated depth map of the scene and a ground truth depth map. Additionally, the computing system can perform an action based on the evaluation. For example, the action performed can be to unlock a device. In another example, the action performed can be to authenticate a user.

In some instances, the machine-learned model can be trained on a training dataset of a plurality of training examples, each training example in the plurality of training examples having a dot image and a ground truth depth map.

In some instances, the computing system can compare the generated depth map of the scene with a ground truth depth map to generate a comparison score. Additionally, the computing system can classify the scene as a spoof representation classification when the comparison score exceeds a threshold value. Moreover, the computing system can reject an authentication request based on the spoof representation classification.

In some instances, the computing system can evaluate the generated depth map of the scene and a ground truth depth map. Additionally, the computing system can perform an action based on the evaluation.

In some instances, the calibration can be performed during a training stage of the machine-learned model by capturing data from a plurality of devices with different calibration. For example, each device in the plurality of devices have a similar model type (e.g., similar smartphone model and operating system).

FIG. 10 depicts a flow chart diagram of an example method for determining a depth map of a scene according to example embodiments of the present disclosure. Although FIG. 10 depicts steps performed in a particular order for purposes of illustration and discussion, the methods of the present disclosure are not limited to the particularly illustrated order or arrangement. The various steps of method 1000 can be omitted, rearranged, combined, and/or adapted in various ways without deviating from the scope of the present disclosure.

At 1002, a computing system can project, using a dot illuminator (e.g., dot illuminator 204), near-infrared (NIR) dots on a scene. For example, the face of a user can be an example of a scene. For example, the computing system at 1002 can be the user computing device 102 described in FIG. 1A.

At 1004, the computing system can generate, using a single camera (e.g., camera 206), a dot image based on the projected NIR dots on the scene. In some instances, the single camera can be a single NIR camera. FIGS. 2A-C depicts an example of how the dot image is generated based on the projected dots on the face of a user.

In some instances, the computing system can capture, using the single camera, the projected NIR dots on the scene to generate the dot image.

At 1006, the computing system can determine a depth map (e.g., depth of the scene) based on the dot image. In some instances, the determination of the depth of the scene can occur without performing a calibration between the dot illuminator and the single camera. For example, the calibration can be performed during a training stage of the machine-learned model. Additionally, the training stage includes capturing data from a plurality of devices with different calibrations. The plurality of devices can have a similar model type, such as a similar mobile phone version. Furthermore, the machine-learned model can be trained offline from collected data.

In some instances, the NIR dots can be projected on the scene in a known pattern, and the computer system can determine a disparity of the known pattern in the dot image. Additionally, the depth of the scene determined at 1006 can be based on the disparity of the known pattern in the dot image. For example, the disparity can be associated with a foreshortening effect, and the disparity can be determined at 1006 by calculating distance between at least two dots in the dot image that is generated at 1004. The at least two dots can be adjacent dots in the dot image.

In some instances, the determination of the depth of the scene can include the computer system selecting an area of the dot image. Additionally, the computing system can compute an observed vector for the area of the dot image. Moreover, the computing system can compare the observed vector to a baseline vector associated with the area to determine the local disparity of the area. Furthermore, the computing system can calculate a local gradient of depth for the area based on the comparison. The determination of the depth at 1006 can be based on the local gradient of depth for the area.

At 1008, the computing system can access a plurality of depth contour plots. In some instances, the plurality of depth contour plots can be associated with a plurality of dot images. In some instances, the plurality of depth contour plots can be generated using time-of-flight (ToF) depth estimation. In some instances, the plurality of depth contour plots can be generated using structured-light depth estimation. In some instances, the plurality of depth contour plots can be generated using stereo reconstruction.

For example, the machine-learned model can determine a depth of the scene based on the dot image. Additionally, the system can access a plurality of depth contour plots. Each plot in the plurality of depth contour plots can be labeled offline and be associated with a specific dot image. The specific dot image for each depth contour plot can be the ground truth. Moreover, the machine-learned model can select a depth contour plot from the plurality of depth contour plots based on the determined depth of the scene At 1010, the computing system can select, using a machine-learned model, a depth contour plot from the plurality of depth contour plots based on the determined depth map (e.g., depth of the scene). For example, the machine-learned model can be the machine-learned models 120, 140 described in FIGS. 1A-1C. In some instances, the machine-learned models 140 can be implemented by the server computing system 130 as a portion of an authentication service. In some instances, the machine-learned models 120 can be stored and implemented at the user computing device 102.

In some instances, a first depth contour plot from the plurality of depth contour plots can be paired with a ground truth depth of the scene. The computing system can select the first depth contour plot based on the determined depth of the scene being similar to the ground truth depth of the scene.

In some implementations, the input to the machine-learned models 120, 140 can be a generated dot image of a captured scene. The machine-learned models 120, 140 can process the generated dot image to generate a depth of the scene. As an example, the machine-learned models 120, 140 can process the generated dot image to generate an image recognition output (e.g., a recognition of the image data, a latent embedding of the image data, an encoded representation of the image data, a hash of the image data). As another example, the machine-learned models 120, 140 can process the image data to generate an image segmentation output. As another example, the machine-learned models 120, 140 can process the image data to generate an image classification output. As another example, the machine-learned models 120, 140 can process the image data to generate an encoded image data output (e.g., an encoded and/or compressed representation of the image data). As another example, the machine-learned models 120, 140 can process the image data to generate a prediction output. Based on the generated output by the machine-learned models 120, 140, the system can select a depth contour plot that is similar (e.g., matches) the generated output.

In some instances, the computing system can evaluate the selected depth contour plot and the determined depth of the scene. Additionally, the computing system can perform an action based on the evaluation. For example, the action performed can be to unlock a device, to authenticate a user, or another action associated with the recognition of a pattern.

For example, the evaluation can be an image classification, where the output is a set of scores, each score corresponding to a different object class and representing the likelihood that the one or more images depict an object belonging to the object class. For example, the authentication of a user can be based on the likelihood of the dot image resembling the selected depth contour plot. The authentication can be approved when the score associated with the generated dot image exceeds a threshold. For example, when the score exceeds the threshold, the system can unlock the device.

ADDITIONAL DISCLOSURE

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for generating a depth map of a scene, the method comprising:

projecting, using a dot illuminator, near-infrared (NIR) dots on the scene, the NIR dots having a uniform pattern;

capturing, using a single NIR camera, the projected NIR dots on the scene;

generating a dot image based on the captured NIR dots on the scene;

processing the dot image with a machine-learned model to generate a depth map of the scene;

wherein the machine-learned model comprises an auto-encoder model comprising one or more neural networks; and wherein the autoencoder model is configured to generate and output the depth map of the scene by:

determining a depth of the scene based on the dot image; and selecting a depth contour plot from a plurality of depth contour plots based on the determined depth of the scene.

2. The method of claim 1, wherein the dot image is a single dot image, and wherein the depth map is generated based on the single dot image.

3. The method of claim 1, wherein machine-learned model is trained on a training dataset of a plurality of training examples, each training example in the plurality of training examples having a dot image and a ground truth depth map.

4. The method of claim 1, further comprising:

comparing the generated depth map of the scene with a ground truth depth map to generate a comparison score;

classifying the scene as a spoof representation classification when the comparison score exceeds a threshold value; and rejecting an authentication request based on the spoof representation classification.

5. The method of claim 1, further comprising:

evaluating the generated depth map of the scene and a ground truth depth map; and performing an action based on the evaluation.

6. The method of claim 5, wherein the action performed is to unlock a device.

7. The method of claim 5, wherein the action performed is authenticating a user.

8. The method of claim 1, wherein the uniform pattern is a uniform dot matrix pattern.

9. The method of claim 1, wherein the generation of the depth map of the scene occurs without performing a calibration between the dot illuminator and the single NIR camera.

10. The method of claim 9, wherein the calibration is performed during a training stage of the machine-learned model by capturing data from a plurality of devices with different calibration.

11. The method of claim 10, wherein each device in the plurality of devices has a similar model type.

12. The method of claim 1, further comprising:

evaluating the selected depth contour plot and the determined depth of the scene; and performing an action based on the evaluation.

13. The method of claim 1, further comprising:

accessing the plurality of depth contour plots, wherein the plurality of depth contour plots is associated with a plurality of dot images.

14. The method of claim 1, wherein each plot in the plurality of depth contour plots is labeled offline and be associated with a specific dot image, and wherein the specific dot image for each depth contour plot is the ground truth.

15. A computing system for performing inference, comprising:

one or more processors; and memory that stores a machine-learned model and instructions that, when executed by the one or more processors, cause the computing system to perform operations, the operations comprising:

projecting, using a dot illuminator, near-infrared (NIR) dots on a scene, the NIR dots having a uniform pattern;

capturing, using a single NIR camera, the projected NIR dots on the scene;

generating a dot image based on the captured NIR dots on the scene; and processing the dot image with a machine-learned model to generate a depth map of the scene;

wherein the machine-learned model comprises an auto-encoder model comprising one or more neural networks; and wherein the autoencoder model is configured to generate and output the depth map of the scene by:

determining a depth of the scene based on the dot image; and selecting a depth contour plot from a plurality of depth contour plots based on the determined depth of the scene.

16. The system of claim 15, the operations further comprising:

comparing the generated depth map with a ground truth depth map to generate a comparison score;

classifying the scene as a spoof representation classification when the comparison score exceeds a threshold value; and rejecting an authentication request based on the spoof representation classification.

17. A computer-implemented method for training a machine-learning model, the method comprising:

obtaining training input comprising a dot image and a ground truth depth map, the dot image being captured using a single camera;

processing the dot image with the machine-learning model to generate a predicted depth map;

wherein the machine-learned model comprises an auto-encoder model comprising one or more neural networks; and wherein the autoencoder model is configured to generate and output the depth map of the scene by:

determining a depth of the scene based on the dot image; and selecting a depth contour plot from a plurality of depth contour plots based on the determined depth of the scene;

evaluating a loss function based on the predicted depth map and the ground truth depth map; and modifying one or more parameters of the machine-learning model based on the evaluation of the loss function.

18. The method of claim 17, wherein the ground truth depth map is generated using at least two cameras that are calibrated to each other.

19. The method of claim 17, wherein the machine-learning model is trained offline, and wherein the ground truth depth map is generated by solving a series of partial differential equations (PDEs).

20. The method of claim 17, wherein the ground truth depth map is generated using time-of-flight (ToF) depth estimation.

* * * * *